(12) United States Patent
Kai et al.

(10) Patent No.: US 10,142,874 B2
(45) Date of Patent: Nov. 27, 2018

(54) BASE STATION APPARATUS AND METHOD FOR ACQUIRING LOAD INFORMATION IN WIRELESS COMMUNICATION SYSTEM

(71) Applicant: NEC Corporation, Tokyo (JP)

(72) Inventors: Kenji Kai, Tokyo (JP); Yoshifumi Yanagisako, Tokyo (JP)

(73) Assignee: NEC Corporation, Tokyo (JP)

( * ) Notice: Subject to any disclaimer, the term of this patent is extended or adjusted under 35 U.S.C. 154(b) by 216 days.

(21) Appl. No.: 14/781,469

(22) PCT Filed: Mar. 27, 2014

(86) PCT No.: PCT/JP2014/001784
§ 371 (c)(1),
(2) Date: Sep. 30, 2015

(87) PCT Pub. No.: WO2014/162704
PCT Pub. Date: Oct. 9, 2014

(65) Prior Publication Data
US 2016/0037400 A1 Feb. 4, 2016

(30) Foreign Application Priority Data
Apr. 1, 2013 (JP) ................................. 2013-076441

(51) Int. Cl.
*H04W 24/10* (2009.01)
*H04W 28/02* (2009.01)
(Continued)

(52) U.S. Cl.
CPC ....... *H04W 24/10* (2013.01); *H04W 28/0247* (2013.01); *H04W 28/08* (2013.01);
(Continued)

(58) Field of Classification Search
CPC ...... H04L 47/14; H04W 24/02; H04W 24/04; H04W 24/10; H04W 28/0247;
(Continued)

(56) References Cited

U.S. PATENT DOCUMENTS

| 2004/0219912 | A1 | 11/2004 | Johansson et al. | |
|---|---|---|---|---|
| 2013/0058313 | A1* | 3/2013 | Engstrom | H04W 24/04 370/331 |
| 2014/0099954 | A1* | 4/2014 | Choi | H04W 36/22 455/436 |

FOREIGN PATENT DOCUMENTS

| CN | 102638864 A | 8/2012 |
|---|---|---|
| EP | 1 475 980 A1 | 11/2004 |

(Continued)

OTHER PUBLICATIONS

NEC, "RAN Sharing enhancements", 3GPP TSG-RAN WG3#73, R3-111992, Aug. 2011.
(Continued)

*Primary Examiner* — Timothy J Weidner
(74) *Attorney, Agent, or Firm* — Finnegan, Henderson, Farabow, Garrett & Dunner, L.L.P.

(57) ABSTRACT

A base station apparatus in a wireless communication system and a method for acquiring load information are provided that make it possible to acquire load information per operator, without changing the standardized interface specifications. In a wireless communication system including base stations (10, 20) each capable of supporting a predetermined number of, or fewer, network operators (A, B, C, D), the first base station (10) retains identification information of network operators supported in a neighbor cell that is managed by the second base station (20) (S30); the first base station (10) sends a load information request message based on the identification information of the operators in the neighbor cell (S32); the second base station (20), in
(Continued)

response to the load information request message, sets load information of a network operator or network operators supported in the neighbor cell in a load information notification message and sends it (S33, S34); and the first base station (10) acquires the load information per operator of the neighbor cell from the load information notification message (S35).

21 Claims, 9 Drawing Sheets

(51) Int. Cl.
  *H04W 28/08*   (2009.01)
  *H04W 28/12*   (2009.01)
  *H04W 36/00*   (2009.01)
  *H04W 36/08*   (2009.01)
  *H04W 36/22*   (2009.01)
  *H04W 48/10*   (2009.01)
  *H04W 84/04*   (2009.01)
  *H04W 88/08*   (2009.01)
  *H04W 92/20*   (2009.01)
  *H04L 12/801*   (2013.01)

(52) U.S. Cl.
  CPC ....... *H04W 28/12* (2013.01); *H04W 36/0061* (2013.01); *H04W 36/08* (2013.01); *H04W 36/22* (2013.01); *H04L 47/14* (2013.01); *H04W 48/10* (2013.01); *H04W 84/042* (2013.01); *H04W 88/08* (2013.01); *H04W 92/20* (2013.01)

(58) Field of Classification Search
  CPC ................. H04W 28/08; H04W 28/12; H04W 36/0055–36/0077; H04W 36/08; H04W 36/22; H04W 40/24–40/32; H04W 48/08–48/10; H04W 48/16; H04W 72/0426; H04W 84/042–84/045; H04W 92/20

See application file for complete search history.

(56) References Cited

FOREIGN PATENT DOCUMENTS

| GB | 2490968 A | 11/2012 | |
|---|---|---|---|
| WO | WO 2012/160977 A1 | 11/2012 | |
| WO | WO 2012160977 A1 * | 11/2012 | ............ H04W 16/14 |

OTHER PUBLICATIONS

NEC, "Details on Load Balancing and ICIC Signaling Mechanism", 3GPP TSG-RAN WG3#59, R3-080388, Feb. 2008.
Extended European Search Report dated Jul. 19, 2016 by the European Patent Office in counterpart European Patent Application No. 14780263.1.
NEC, "Use case on Load balancing among shared LTE cells", 3GPP TSG-SA WG1 Meeting #59, S1-122186, Aug. 2012.
Huawei, "New use case on Load balancing based on operator's load level" 3GPP TSG-SA WG1 #59, S1-122111, Aug. 2012.
3GPP TR 36.902, V9.3.1, $3^{rd}$ Generation Partnership Project; Technical Specification Group Radio Access Network; Evolved Universal Terrestrial Radio Access Network (E-UTRAN); "Self-configuring and self-optimizing network (SON) use cases and solutions" (Release 9), Mar. 2011.
International Search Report and Written Opinion dated Jul. 1, 2014 in corresponding PCT International Application.
Notification of First Office Action dated Jan. 31, 2018, from the State Intellectual Property Office of the People's Republic of China in counterpart Chinese Patent Application No. 201480020216.2.
"RAN Sharing Enhancements", NEC, (3GPP-TSG-RAN WG3#73, R3-111992), Aug. 22-26, 2011, Athens Greece, pp. 1-5.

* cited by examiner

FIG. 3

SUPPORTED OPERATOR TABLE 105

| | OWN CELL SUPPORTED PLMN | | NEIGHBOR CELL SUPPORTED PLMN | |
|---|---|---|---|---|
| | OWN CELL C1 | ... | NEIGHBOR CELL Cn1 | NEIGHBOR CELL Cn2 | ... |
| PLMN1 | A | | A | B |
| PLMN2 | B | | C | E |
| PLMN3 | C | | D | F |
| PLMN4 | D | | G | H |
| PLMN5 | E | | | I |
| PLMN6 | F | | | J |

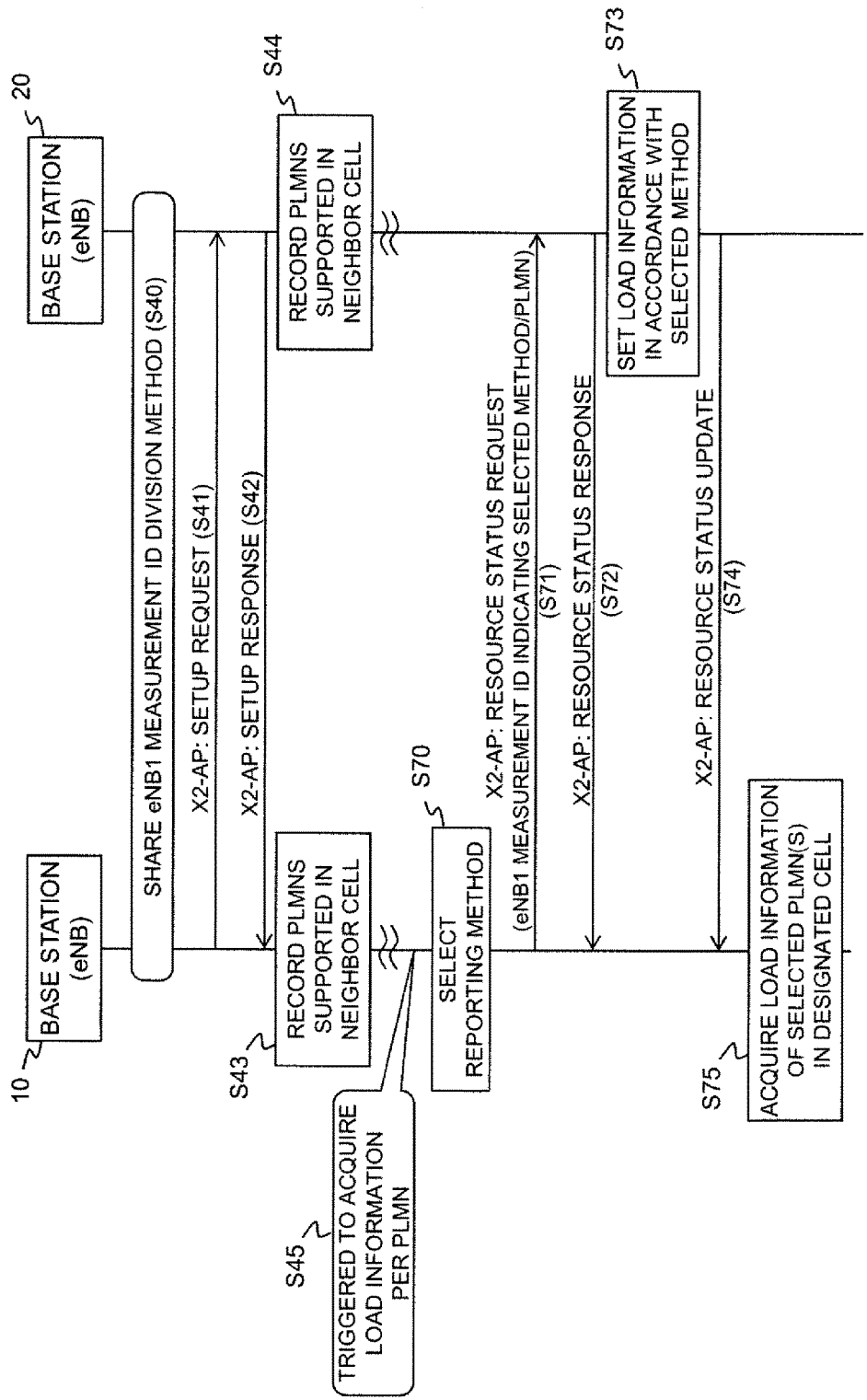

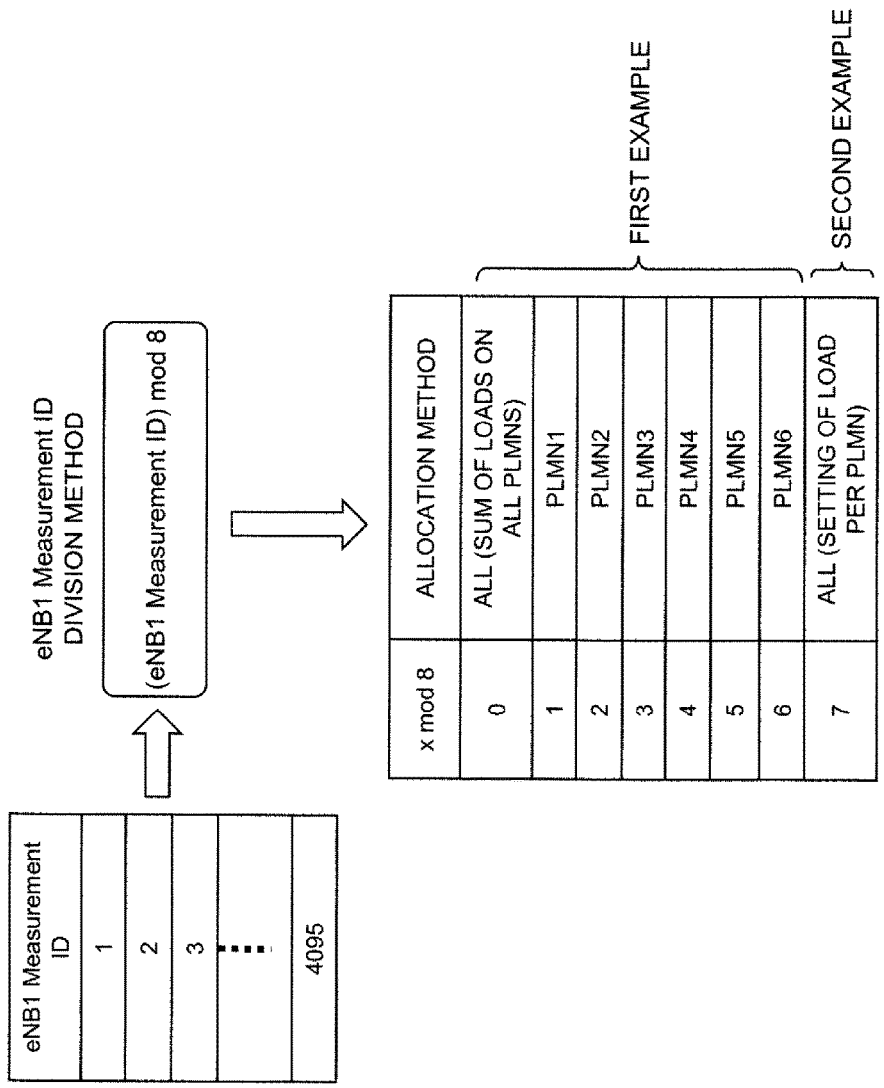

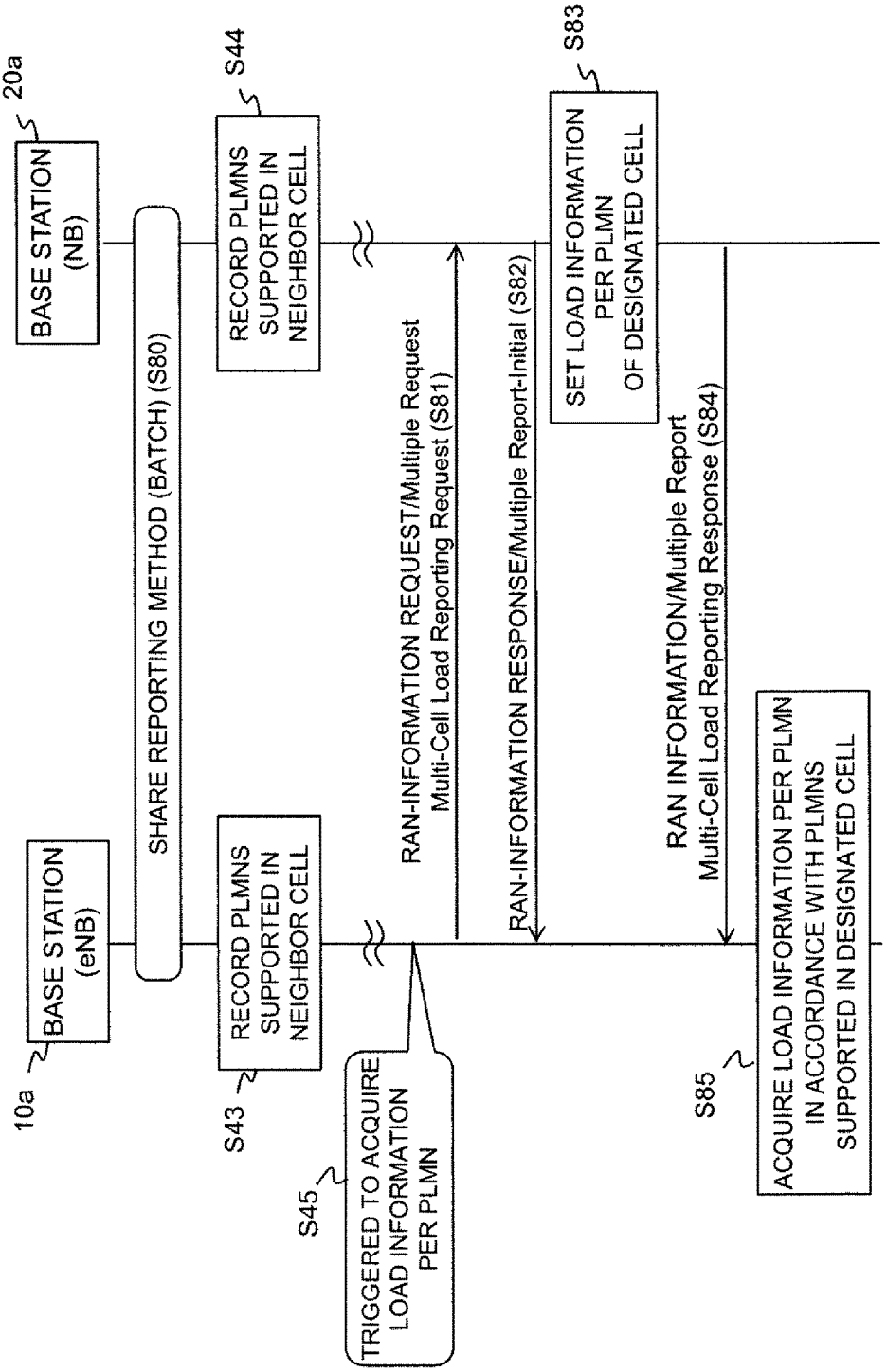

US 10,142,874 B2

BASE STATION APPARATUS AND METHOD FOR ACQUIRING LOAD INFORMATION IN WIRELESS COMMUNICATION SYSTEM

CROSS-REFERENCE TO RELATED PATENT APPLICATIONS

This application is a National Stage Entry of International Application No. PCT/JP2014/001784, filed Mar. 27, 2014, which claims priority from Japanese Patent Application No. 2013-076441, filed Apr. 1, 2013. The entire contents of the above-referenced applications are expressly incorporated herein by reference.

TECHNICAL FIELD

The present invention relates to wireless communication systems and, more particularly, to a base station apparatus and a method for acquiring load information of a neighbor cell.

BACKGROUND ART

In recent years, active studies have been conducted on SON (Self Organizing Network), which autonomously optimizes radio parameters and network configurations in wireless communication systems such as cellular systems, in view of operation cost (OPEX) reduction and the like. Standardization of SON functions is under way also in LTE (Long Term Evolution) of 3GPP ($3^{rd}$ Generation Partnership Project). In order to implement Optimization of load balancing (Mobility Load Balancing: MLB) among the Self-Optimization functions included in SON, various methods for acquiring load information have been proposed.

For example, according to a method disclosed in PTL 1, in a system in which a plurality of network operators share a base station, the base station monitors a load ratio attributable to each operator and notifies the monitoring results to another base station over the X2 interface by using a Resource Status Request/Report message or the like. Base stations exchange load information per operator (per PLMN (Public Land Mobile Network)) in this manner, thereby attempting to accomplish load balancing.

CITATION LIST

Patent Literature

[PTL 1]
International Publication No. WO2012/160977A1

SUMMARY OF INVENTION

Technical Problem

However, in the method disclosed in PTL 1, base stations exchange a load ratio for each operator they have monitored themselves by using Resource Status Request/Update messages or the like, and it is necessary to change the interface specifications prescribed by 3GPP (3rd Generation Partnership Project).

Accordingly, an object of the present invention is to provide a base station apparatus in a wireless communication system and a method for acquiring load information, which make it possible to acquire load information per operator without changing the standardized interface specifications.

Solution to Problem

A wireless communication system according to the present invention is a wireless communication system including base stations, each capable of supporting a predetermined number of, or fewer, network operators, characterized in that a first base station retains identification information of network operators supported in a neighbor cell that is managed by a second base station, the first base station sends a load information request message, based on the identification information of the operators in the neighbor cell, the second base station, in response to the load information request message, sets load information of a network operator or network operators supported in the neighbor cell in a load information notification message and sends it, and the first base station acquires the load information per operator of the neighbor cell from the load information notification message.

A base station apparatus according to the present invention is a base station apparatus that is capable of supporting a predetermined number of, or fewer, network operators, characterized by comprising: supported operator storage means for storing identification information of network operators supported in a neighbor cell; and load information acquisition means that sends a load information request message to another base station apparatus managing the neighbor cell based on the identification information of the operators in the neighbor cell and, from a load information notification message responding to the load information request message, acquires load information per operator of the neighbor cell.

A base station apparatus according to the present invention is a base station apparatus that is capable of supporting a predetermined number of, or fewer, network operators, characterized by comprising: supported operator storage means for storing identification information of network operators in a cell of the own station that is adjacent to a cell managed by another base station apparatus; and control means that, by referring to the identification information of the operators in the cell of the own station, sets load information of a network operator or network operators in the cell of the own station in a load information notification message and sends it, in response to a load information request message received from the another base station apparatus.

A method for acquiring load information according to the present invention is a method for acquiring load information in a wireless communication system including base stations, each capable of supporting a predetermined number of, or fewer, network operators, characterized by comprising: by a first base station, retaining identification information of network operators supported in a neighbor cell that is managed by a second base station; by the first base station, sending a load information request message, based on the identification information of the operators in the neighbor cell; by the second base station, in response to the load information request message, setting load information of a network operator or network operators supported in the neighbor cell in a load information notification message and sending it; and by the first base station, acquiring the load information per operator of the neighbor cell from the load information notification message.

Advantageous Effects of Invention

According to the present invention, it is possible to acquire load information per operator, without changing the standardized interface specifications.

BRIEF DESCRIPTION OF DRAWINGS

FIG. 3 is a schematic diagram showing an example of the structure of a supported operator table 105 in the present exemplary embodiment.

FIG. 7 is an inter-base-station sequence diagram showing a method for acquiring load information according to a third example of the present invention.

FIG. 8 is a schematic diagram showing an example of a method for dividing eNB1 Measurement IDs in the third example.

FIG. 9 is an inter-base-station sequence diagram showing a method for acquiring load information according to a fourth example of the present invention.

DESCRIPTION OF EMBODIMENTS

According to an exemplary embodiment of the present invention, information on network operators supported in a neighbor cell is retained, and load information per operator of the neighbor cell is acquired in accordance with an existing interface. For example, eNB1 Measurement IDs are divided in accordance with a predetermined division rule, and the operators (PLMN-IDs) supported in the neighbor cell are associated with them, respectively, whereby load information per operator of the neighbor cell can be acquired. Alternatively, it is also possible that load information of the individual operators in the neighbor cell is acquired collectively in accordance with an existing load information request/notification message, and load information of each operator is acquired by referring to the retained information on the operators in the neighbor cell.

In this manner, it is possible to acquire load information per operator, without changing the interface specifications prescribed by 3GPP, and thus to accomplish load valancing per operator in an environment in which a base station is shared by a plurality of network operators. Hereinafter, an exemplary embodiment and examples of the present invention will be described in detail with reference to drawings.

1. Exemplary Embodiment

Figure 1:
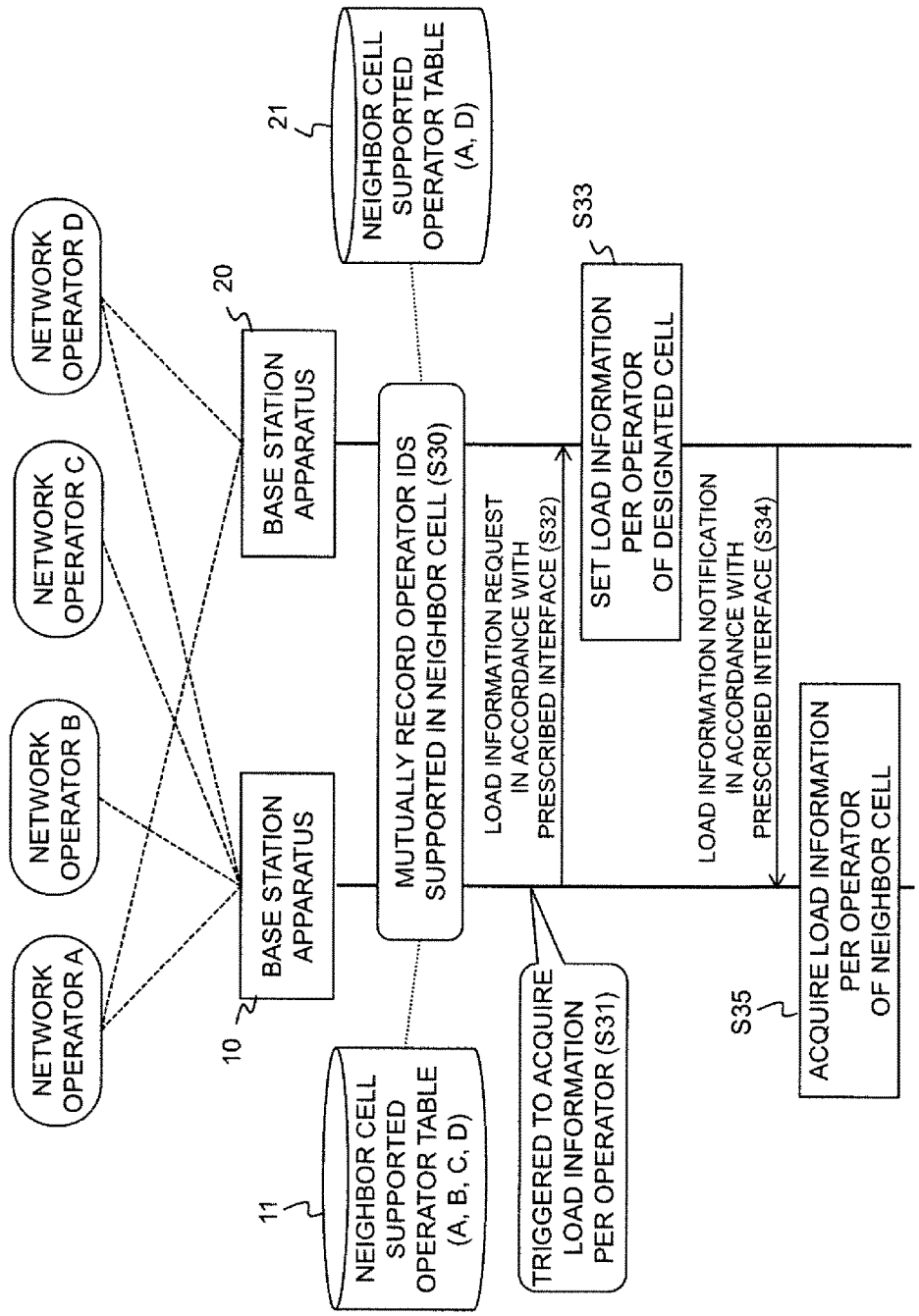
FIG. 1 is a sequence diagram showing basic operations in a wireless communication system according to an exemplary embodiment of the present invention.

Referring to FIG. 1, it is assumed that base station apparatuses 10 and 20 have cells, respectively, that are adjacent to each other and can communicate with each other over the X2 interface or the S1 interface. Moreover, it is assumed that each of the base station apparatuses 10 and 20 can be shared by N network operators at maximum, and shown here is a case in which the base station apparatus 10 is shared by Network Operators A, B, C and D, whereas the base station apparatus 20 is shared by Network Operators A and D. Furthermore, it is assumed that the base station apparatuses 10 and 20 are provided with neighbor cell supported operator tables 11 and 12, respectively.

First, one of the base station apparatuses 10 and 20 acquires configuration information of the other and record identification information of the operators supported in the neighbor cell into the respective neighbor cell supported operator tables 11 and 21 (Operation S30). The neighbor cell supported operator table 11 of the base station apparatus 10 stores Network Operators A, B, C and D, and the neighbor cell supported operator table 21 of the base station apparatus 20 stores Network Operators A and D.

Subsequently, when the base station apparatus 10 is triggered to acquire load information per operator (Operation S31), the base station apparatus 10 refers to the neighbor cell supported operator table 11, specifies one or a plurality of operators supported in the neighbor cell, and sends a load information request message to the base station apparatus 20 in accordance with a prescribed interface (Operation S32). The base station apparatus 20 having received the load information request message sets load information per designated operator supported in the cell of the own station, in a load information notification message (Operation S33) and sends it to the base station apparatus 10 (Operation S34). The following are among the prescribed interfaces for load information request and load information notification.

For Intra LTE, a RESOURCE STATUS REQUEST message in the Resource Status Reporting Initiation Procedure (3GPP TS36.423 V11.0.0 Sec 8.3.6), and a RESOURCE STATUS UPDATE message in the Resource Status Reporting Procedure (3GPP TS36.423 V11.0.0 Sec 8.3.7).

For Inter RAT, a RAN-INFORMATION REQUEST/Multiple Report message in which a Multi-Cell Load Reporting Request (3GPP TS36.413 V11.2.1 Sec B.1.7) is set, in the RAN Information Request/Multiple Report Procedure (3GPP TS48.018 V11.2.0 Sec 8c.2.2.2), and a RAN-INFORMATION/Multiple Report message in which a Multi-Cell Load Reporting Response (3GPP TS36.413 V11.2.1 Sec B.1.9) is set, in the RAN Information Send Procedure (3GPP TS48.018 V11.2.0 Sec 8c.2.3).

Thus, the base station apparatus 10 receives a notification in response to the load information request from the base station apparatus 20 in accordance with the prescribed interface and thereby can acquire load information per operator of the neighbor cell, which is set in the notification message (Operation S35). The base station apparatus 20 can also acquire load information per operator of its neighbor cell by similarly sending a load information request to the base station apparatus 10 in accordance with the prescribed interface and receiving a notification in response thereto.

Each of the base station apparatuses 10 and 20 has a basically similar configuration, and therefore a device configuration will be described with reference to FIGS. 2 and 3 below.

2. Configuration of Base Station Apparatus

Figure 2:
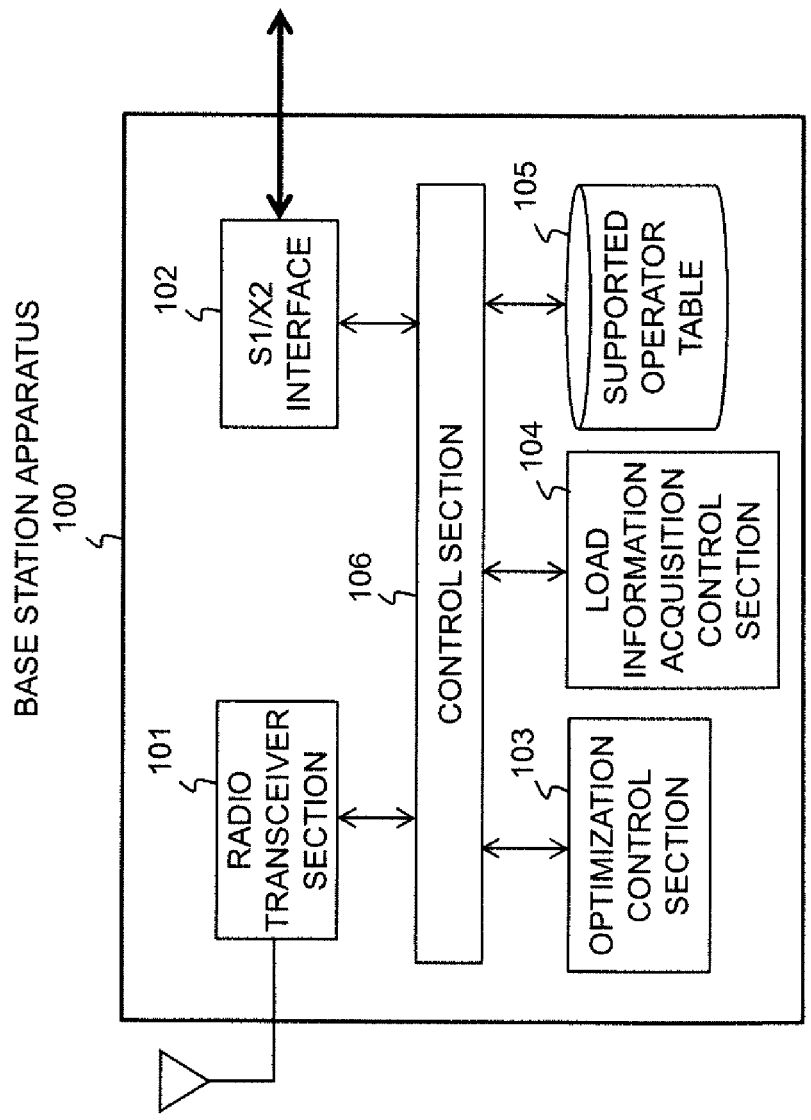
FIG. 2 is a block diagram showing a functional configuration of a base station apparatus in the present exemplary embodiment.

Referring to FIG. 2, a base station apparatus 100 according to the present exemplary embodiment includes a radio transceiver section 101 for wirelessly communicating with wireless terminals in a cell of the own station, a S1/X2 interface section 102 for communicating with other base station apparatuses or a core network, an optimization control section 103 for controlling optimization of load balancing and the like, a load information acquisition control section 104 for performing load information acquisition control according to the present exemplary embodiment, a supported operator table 105 storing operators supported in the cell of the own station and neighbor cells, and a control section 106 for controlling operations of the base station apparatus 100. Hereinafter, a description will be given of the structure of the supported operator table 105 in a case where the base station apparatus 100 can be shared by six network operators (PLMN1 to PLMN6) at maximum.

Referring to FIG. 3, operators (PLMNs) supported in the cell of the own station are registered beforehand in the supported operator table 105, and operators supported in a neighbor cell are additionally registered by exchanging configuration information with a base station apparatus in the neighborhood. Here, as an example, it is assumed that for PLMN1 to PLMN6 in this order, Network Operators A, B, C, D, E and F are registered with respect to the cell C1 of the own station, Network Operators A, C, D and G are registered with respect to a neighbor cell Cn1, and similarly, Network Operators B, E, F, H, I and J are registered with respect to a neighbor cell Cn2. Note that configuration information of Network Operators A, B, C, D, E and F in the cell C1 of the own station is also notified to another base station apparatus and registered as operators supported in a neighbor cell in the supported operator table 105 of the another base station apparatus. Note that it is also possible that the base station apparatus 100 is provided with a computer (CPU: Central Processing Unit) and a storage device storing programs (not shown), and functions equivalent to the above-described optimization control section 103, load information acquisition control section 104 and control section 106 are implemented by executing the programs on the computer.

3. First Example

Hereinafter, using the above-mentioned Intra LTE as an example, the base station apparatuses 10 and 20 will be represented by eNBs 10 and 20, respectively. According to a first example of the present invention, eNB1 Measurement IDs are divided in accordance with a predetermined division rule, and operators (PLMN-IDs) supported in a neighbor cell are associated with them, respectively, whereby load information per operator of the neighbor cell is acquired. The eNB1 Measurement IDs are measurement identification information allocated in order for an eNB on the measurement requesting side to identify a measurement configuration through the X2 interface, and integers 1 to 4095 are allocated in accordance with a specification (3GPP TS36.423 V11.0.0 Sec 9.1.2.11 and Sec 9.1.2.12).

3.1) Operations

Figure 4:
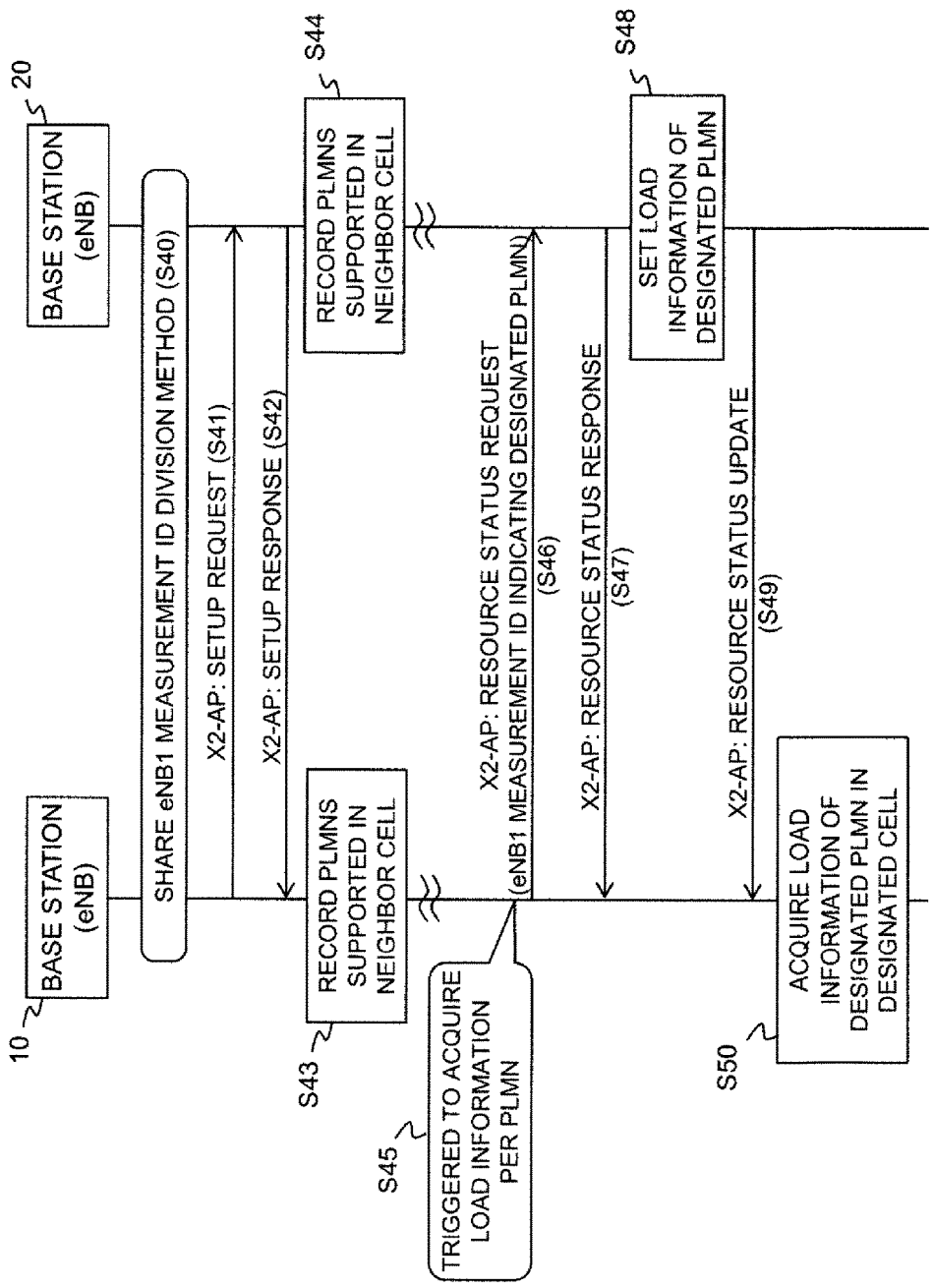
FIG. 4 is an inter-base-station sequence diagram showing a method for acquiring load information according to a first example of the present invention.

Referring to FIG. 4, it is necessary that the eNBs 10 and 20 should share a method for dividing the eNB1 Measurement IDs (Operation S40). Specifically, the same division method is set in the respective load information acquisition control sections 104 of the eNBs 10 and 20. For this division method, any method will do as long as the eNBs 10 and 20 can share the same result of division, and it is not limited to a specific division method. A specific example of the division method will be described later.

Subsequently, a SETUP REQUEST message and a SETUP RESPONSE message are sent and received between the eNBs 10 and 20 over the X2 interface (Operations S41 and S42), and PLMNs supported in their respective neighbor cells are recorded in the respective supported operator tables 105 of the eNBs 10 and 20 (Operations S43 and S44).

In this state, when the eNB 10 is triggered to acquire load information per operator (Operation S45), the load information acquisition control section 104 of the eNB 10 refers to the supported operator table 105 and sends the eNB 20 a RESOURCE STATUS REQUEST message in which information is set that designates an operator supported in the neighbor cell (here, one of the eNB1 Measurement IDs, which are divided for the individual PLMNs) (Operation S46).

The load information acquisition control section 104 of the eNB 20 having received the RESOURCE STATUS REQUEST message sends a RESOURCE STATUS RESPONSE message back to the eNB 10 (Operation S47) and thereafter identifies the designated operator (PLMN) in the designated cell based on the eNB1 Measurement ID set in the RESOURCE STATUS REQUEST message. A measurement result (load information) thereon is then set in a RESOURCE STATUS UPDATE message (Operation S48), which is then sent to the eNB 10 (Operation S49). Thus, the load information acquisition control section 104 of the eNB 10 can acquire the load information of the designated operator (PLMN) from the received RESOURCE STATUS UPDATE message (Operation S50).

However, according to the current specification (3GPP TS36.423 V11.0.0 Sec 8.3.7), only one piece of information can be set over the interface for RESOURCE STATUS UPDATE with respect to the same cell, and therefore a plurality of RESOURCE STATUS REQUEST messages need to be sent if load information of other operators (PLMNs) is requested.

3.2) Division Method

Figure 5:
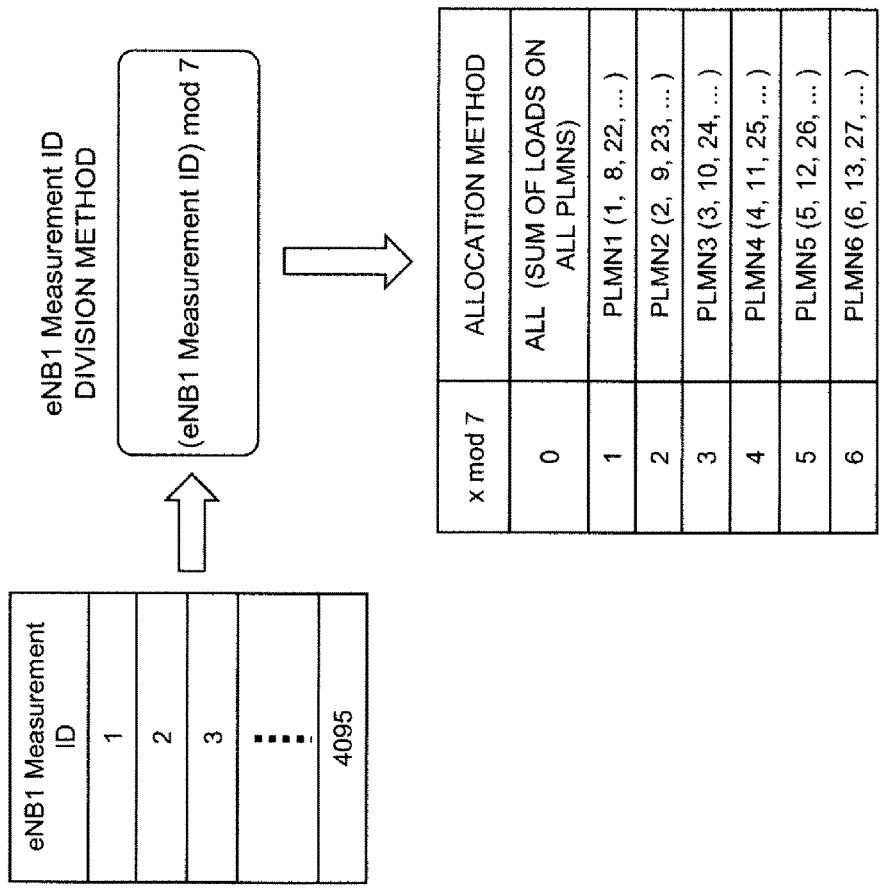
FIG. 5 is a schematic diagram showing an example of a method for dividing eNB1 Measurement IDs in the first example.

FIG. 5 shows an example using (eNB1 Measurement ID) mod 7 as a predetermined division rule, which yields the remainders of the division of eNB1 Measurement IDs (integers 1 to 4095) by 7. Using this calculation, the eNB1 Measurement IDs are divided into seven groups, which are allocated to load information acquisition targets, respectively. Here, (eNB1 Measurement ID) mod 7=0 is allocated to an existing approach that adds up loads on all operators, and (eNB1 Measurement ID) mod 7=1 to 6 are allocated to the operators PLMN1 to PLMN6, respectively.

Accordingly, when requesting load information of Operator C that corresponds to PLMN2 in the neighbor cell Cn1 as shown in FIG. 3, a RESOURCE STATUS REQUEST message in which, for example, eNB1 Measurement ID=2 is set is sent to the eNB 20. Since the eNB 20 having received this message can find PLMN2 from eNB1 Measurement ID=2 by using the same division rule, the eNB 20 sets load information of Operator C in a RESOURCE STATUS UPDATE message and returns it to the eNB 10. Thus, it is possible to acquire load information of an arbitrary operator in a neighbor cell.

4. Second Example

According to a second example of the present invention, load information of operators in a neighbor cell is acquired collectively in accordance with an existing load information request/notification message, and load information of each operator is acquired by referring to retained information on the operators in the neighbor cell.

Figure 6:
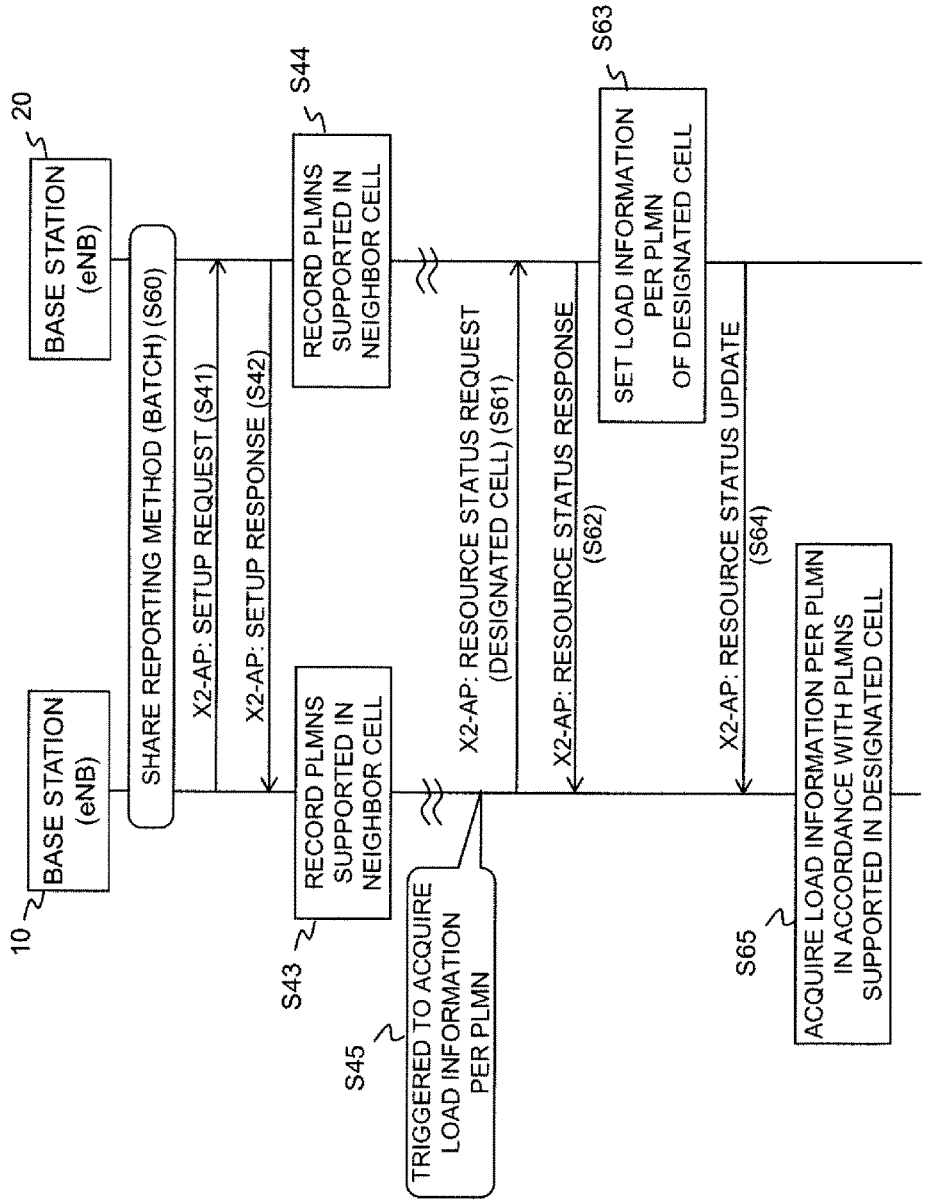
FIG. 6 is an inter-base-station sequence diagram showing a method for acquiring load information according to a second example of the present invention.

Referring to FIG. 6, first, a reporting method is shared between base stations (Operation S60). The subsequent Operations S41 to S44 are similar to those of the first example shown in FIG. 5, and therefore a description thereof will be omitted. When the eNB 10 is triggered to acquire load information per operator (Operation S45), the load information acquisition control section 104 of the eNB 10 sends the eNB 20 a RESOURCE STATUS REQUEST message in which a neighbor cell that is a load information acquisition target is designated (Operation S61).

The load information acquisition control section 104 of the eNB 20 having received the RESOURCE STATUS REQUEST message returns a RESOURCE STATUS RESPONSE message to the eNB 10 (Operation S62). Thereafter, the load information acquisition control section 104 of the eNB 20 sets respective load information of all the operators in the cell designated in the RESOURCE STATUS REQUEST message, in a RESOURCE STATUS UPDATE message in the same order as in the case of the configuration information notified in Operation S42 (Operation S63) and sends this RESOURCE STATUS UPDATE message to the eNB 10 (Operation S64). For example, when the neighbor cell Cn1 as shown in FIG. 3 is designated, load information of Operators A, C, D and G are set in the order of PLMN1 to PLMN4.

When receiving the RESOURCE STATUS UPDATE message that includes a plurality of pieces of load information with respect to the same cell ID, the load information acquisition control section 104 of the eNB 10 refers to the setting order of the neighbor cell Cn1 in the supported operator table 105 and thereby can acquire the load information of all the operators (PLMNs) supported in the neighbor cell Cn1 from the RESOURCE STATUS UPDATE message (Operation S65).

5. Third Example

According to a third example of the present invention, the eNB1 Measurement ID division rule in the first example is extended, thereby making it possible to select the individual reporting method according to the first example or the batch reporting method according to the second example, depending on the number of operators or cells that are load information acquisition targets.

5.1) Operations

Referring to FIG. 7, Operations S40 to S44 are similar to those of the first example shown in FIG. 5, and therefore a description thereof will be omitted. However, a division method employed in the present example is an extended version of the eNB1 Measurement ID division rule in the first example, and a specific example thereof will be described later.

When the eNB 10 is triggered to acquire load information per operator (Operation S45), the load information acquisition control section 104 of the eNB 10 compares the number of all operators supported in a neighbor cell that is a load information acquisition target with the number of operators whose load information is to be acquired, and selects either of the individual reporting method according to the first example or the batch reporting method according to the second example, depending on a result of the comparison (Operation S70). A specific selection method and selection criterion will be described later. Then, a RESOURCE STATUS REQUEST message in which an eNB1 Measurement ID according to the selected reporting method is set is sent to the eNB 20 (Operation S71).

The load information acquisition control section 104 of the eNB 20 having received the RESOURCE STATUS REQUEST message returns a RESOURCE STATUS RESPONSE message to the eNB 10 (Operation S72). Thereafter the load information acquisition control section 104 of the eNB 20 sets load information in a RESOURCE STATUS UPDATE message by the individual or batch reporting method in accordance with the eNB1 Measurement ID set in the RESOURCE STATUS REQUEST message (Operation S73) and sends the RESOURCE STATUS UPDATE message to the eNB 10 (Operation S74). Thus, the load information acquisition control section 104 of the eNB 10 can acquire the load information of the operators (PLMNs) from the received RESOURCE STATUS UPDATE message(s) in accordance with the selected reporting method (Operation S75).

5.2) Extension of Division Method

As described above, according to the individual reporting method of the first example, when load information of a plurality of operators (PLMNs) is requested, a plurality of RESOURCE STATUS REQUEST messages need to be sent, and in response to them, RESOURCE STATUS UPDATE messages are periodically sent. Accordingly, considering loads on the X2 interface, the individual reporting method of the first example is preferably selected in the case of load information of a small number of operators, or of one cell. Conversely, in the case of load information of a large number of operators, or a plurality of cells, the batch reporting method of the second example is favorable. Accordingly, the eNB1 Measurement ID division rule in the first example is extended, thereby making it possible to select the load information reporting method of the first example or of the second example, depending on the number of load information acquisition targets.

FIG. 8 shows an example using (eNB1 Measurement ID) mod 8 as a predetermined division rule, which yields the remainders of the division of eNB1 Measurement IDs (integers 1 to 4095) by 8. Using this calculation, the eNB1 Measurement IDs are divided into eight groups, which are allocated to load information acquisition targets, respectively. Here, (eNB1 Measurement ID) mod 8=0 is allocated to an existing approach that adds up loads on all operators; (eNB1 Measurement ID) mod 8=1 to 6 are allocated to the individual reporting method of the first example, with them being allocated to operators PLMN1 to PLMN6, respectively; and (eNB1 Measurement ID) mod 8=7 is allocated to the batch reporting method of the second example, with it being allocated to all operators as a single batch.

For example, when requesting load information of Operator C that corresponds to PLMN2 in the neighbor cell Cn1 as shown in FIG. 3, a RESOURCE STATUS REQUEST message in which, for example, eNB1 Measurement ID=2 is set is sent to the eNB 20. Since the eNB 20 having received this message can find PLMN2 from eNB1 Measurement ID=2 by using the same division rule, the eNB 20 sets load information of Operator C in a RESOURCE STATUS UPDATE message and returns it to the eNB 10. Thus, it is possible to acquire load information of an arbitrary operator in a neighbor cell in accordance with the individual reporting method of the first example.

Moreover, when requesting load information of Operators C, D and G that correspond to PLMN2 to PLMN4 in the neighbor cell Cn1 as shown in FIG. 3, the batch reporting method of the second example is selected, and a RESOURCE STATUS REQUEST message in which, for example, eNB1 Measurement ID=7 is set is sent to the eNB 20. Since the eNB 20 having received this message can find from eNB1 Measurement ID=7 by using the same division rule that all PLMN1 to PLMN4 in the cell Cn1 are to be reported collectively, the eNB 20 sets load information of Operators A, C, D and G in this order in a RESOURCE STATUS UPDATE message in a repeated manner, and returns it to the eNB 10. The load information acquisition control section 104 of the eNB 10, when receiving the RESOURCE STATUS UPDATE message that includes the plurality of pieces of load information with respect to the same cell ID, refers to the setting order of the neighbor cell Cn1 in the supported operator table 105 and thereby can acquire from the RESOURCE STATUS UPDATE message the load information of all the operators (PLMNs) supported in the neighbor cell Cn1, from which the originally requested load information of Operators C, D and G can be extracted.

6. Fourth Example

A fourth example of the present invention is an application of the above-described second example to the acquisition of load information through a RIM (RAN Information Management) procedure in Inter RAT.

Referring to FIG. 9, base stations 10a and 20a are radio base stations deployed in different radio access systems, respectively, and perform a load information acquisition procedure based on the RIM procedure, which will be described next.

First, it is assumed that a reporting method has been shared between the base stations (Operation S80), and that operators (PLMNs) supported in a neighbor cell have been recorded in the respective supported operator tables 105 of the base stations 10a and 20a based on O&M (Operation and Management) data (Operations S43 and S44).

In this state, when the base station 10a is triggered to acquire load information per operator (Operation S45), the load information acquisition control section 104 of the base station 10a sends a RAN INFORMATION REQUEST/ Multiple Report message to the base station 20a via a core network, the RAN INFORMATION REQUEST/Multiple Report message setting a neighbor cell that is a load information acquisition target, as a Multi-Cell Load Reporting Request (Operation S81).

The load information acquisition control section 104 of the base station 20a having received the RAN INFORMATION REQUEST/Multiple Report message in which the Multi-Cell Load Reporting Request is set returns a RAN INFORMATION RESPONSE/Multiple Report-Initial message to the base station 10a via the core network (Operation S82). Thereafter the load information acquisition control section 104 of the base station 20a sets respective load information of all the operators in the cell designated by the Multi-Cell Load Reporting Request in the RAN INFORMATION REQUEST/Multiple Report message, into a Multi-Cell Load Reporting Response (Operation S83) and sends a RAN INFORMATION/Multiple Report message that includes the Multi-Cell Load Reporting Response to the base station 10a via the core network (Operation S84). For example, when the neighbor cell Cn1 as shown in FIG. 3 is designated, load information of Operators A, C, D and G is set in the order of PLMN1 to PLMN4 in a Multi-Cell Load Reporting Response in a RAN INFORMATION//Multiple Report message.

When receiving the RAN INFORMATION/Multiple Report message in which the Multi-Cell Load Reporting Response is set, the load information acquisition control section 104 of the base station 10a refers to the setting order of the neighbor cell Cn1 in the supported operator table 105 and thereby can acquire the load information of all the operators (PLMNs) supported in the neighbor cell Cn1 from the received message (Operation S85).

INDUSTRIAL APPLICABILITY

The present invention is applicable to the acquisition of load information in the LTE system.

REFERENCE SIGNS LIST 10, 10a Base station apparatus (base station)
11 Neighbor cell supported operator table
20, 20a Base station apparatus (base station)
21 Neighbor cell supported operator table
100 Base station apparatus
101 Radio transceiver section
102 S1/X2 interface
103 Optimization control section
104 Load information acquisition control section
105 Supported operator table
106 Control section

The invention claimed is:

1. A base station apparatus that is capable of supporting a predetermined number or fewer of network operators, comprising:
    a memory that stores identifiers of network operators supported in a neighbor cell managed by another base station apparatus,
        wherein the identifiers of network operators are obtained by exchanging a prescribed setup request message and a prescribed setup response message between the base station apparatus and the another base station apparatus, or are obtained based on prescribed network management data; and
    a processor that is configured to execute a set of instructions to:
        send a prescribed load information request message to the another base station apparatus, wherein the prescribed load information request message includes identification information of at least one of the network operators in the neighbor cell;
        receive, from said another base station apparatus in response to the prescribed load information request message, a prescribed load information message that includes load information of the at least one network operator; and
        acquire load information per network operator of the neighbor cell from the prescribed load information message,
        wherein the identifiers of the network operators in the neighbor cell stored in the memory are arranged in a predetermined order which is shared with the another base station apparatus,
            wherein the predetermined order is notified by the prescribed setup request message or by the prescribed setup response message received from the another base station apparatus.

2. The base station apparatus according to claim 1, wherein the processor is further configured to execute the instructions to send the prescribed load information request message as an individual reporting request.

3. The base station apparatus according to claim 2, wherein the processor is further configured to execute the instructions to:
    divide evolved node B 1 measurement identities (eNB1 Measurement IDs) into a predetermined number of groups in accordance with a predetermined division rule shared with the another base station apparatus;
    associate each of the network operators in the neighbor cell with a different one of the groups; and
    set an eNB1 Measurement ID included in a group corresponding to a desired network operator in the prescribed load information request message.

4. The base station apparatus according to claim 1, wherein the processor is further configured to execute the instructions to send the prescribed load information request message as a batch reporting request.

5. The base station apparatus according to claim 4, wherein the processor is further configured to execute the instructions to set a designated neighbor cell and identifiers of desired network operators supported by the designated neighbor cell, in the prescribed load information request message.

6. The base station apparatus according to claim 5, wherein the processor is further configured to execute the instructions to acquire load information per network operator of the designated neighbor cell from the prescribed load information message by referring to the identifiers of the network operators in the designated neighbor cell stored in the memory.

7. The base station apparatus according to claim 1, wherein the processor is further configured to execute the instructions to set the prescribed load information request message for either an individual reporting request or a batch reporting request, depending on the number of network operators whose load information is requested.

8. The base station apparatus according to claim 7, wherein the processor is further configured to execute the instructions to:
    divide eNB1 Measurement IDs into a predetermined number of groups in accordance with a predetermined division rule shared with the another base station apparatus;
    allocate at least one part of the groups to the individual reporting request and at least the other part of the groups to the batch reporting request.

9. The base station apparatus according to claim 1, wherein the prescribed load information request message and the prescribed load information message are a message based on Resource Status Reporting Initiation Procedure and a message based on Resource Status Reporting Procedure in an LTE (Long Term Evolution) system, respectively.

10. The base station apparatus according to claim 1, wherein the prescribed load information request message and the prescribed load information message are a message based on Multi-Cell Load Reporting Request in RAN (Radio Access Network) Information Request/Multiple Report Procedure and a message based on Multi-Cell Load Reporting Response in RAN Information Send Procedure in Inter RAT (Radio Access Technology), respectively.

11. A base station apparatus that is capable of supporting a predetermined number or fewer of network operators, comprising:
    a memory that stores identification information of network operators in a first cell of the base station apparatus and identification information of network operators in a second cell managed by another base station apparatus, wherein the first cell is adjacent to the second cell,
    wherein the identification information of network operators in the second cell are obtained by exchanging a prescribed setup request message and a prescribed setup response message between the base station apparatus and the another base station apparatus, or are obtained based on prescribed network management data; and
    a processor that is configured to execute a set of instructions to:
        receive a prescribed load information request message from the another base station apparatus, wherein the prescribed load information request message includes identification information of at least one of the network operators in the first cell;
        identify the at least one network operator in the first cell by referring to the identification information of the network operators in the first cell in response to the prescribed load information request message;
        set load information of the at least one network operator in the first cell in a prescribed load information message; and
        send the prescribed load information message back to the another base station apparatus,
    wherein the identification information of the network operators in the first cell stored in the memory are arranged in a predetermined order which is shared with the another base station apparatus,
    wherein the predetermined order is notified by the prescribed setup request message or by the prescribed setup response message received from the another base station apparatus.

12. The base station apparatus according to claim 11, wherein the processor is further configured to execute the instructions to:
    receive an individual reporting request by means of the prescribed load information request message;
    set load information of each network operator supported in the first cell identified by the identification information individually in the prescribed load information message; and
    send the prescribed load information message back to the another base station apparatus.

13. The base station apparatus according to claim 12, wherein the another base station apparatus creates the prescribed load information request message by:
    dividing evolved node B 1 measurement identities (eNB1 Measurement IDs) into a predetermined number of groups in accordance with a predetermined division rule shared with the base station apparatus;
    associating each of the network operators in the neighbor cell with a different one of the groups; and
    setting an eNB1 Measurement ID included in a group corresponding to a desired network operator in the prescribed load information request message.

14. The base station apparatus according to claim 13, wherein the processor is further configured to execute the instructions to:
    identify the identification information of the network operator whose load information is requested, in accordance with the predetermined division rule by using the eNB1 Measurement ID set in the prescribed load information request message received from the another base station apparatus; and set load information of the network operator whose load information is requested in the prescribed load information message.

15. The base station apparatus according to claim 11, wherein the processor is further configured to execute the instructions to:
set load information of all of the network operators supported in the neighbor cell collectively in the prescribed load information message; and
send the prescribed load information message back to the another base station apparatus, in response to a batch reporting request by means of the prescribed load information request message.

16. The base station apparatus according to claim 15, wherein a designated neighbor cell including identification information of desired operators is set in the prescribed load information request message.

17. The base station apparatus according to claim 16, wherein the processor is further configured to execute the instructions to set load information per network operator of all network operators supported in the designated neighbor cell set in the prescribed load information request message, in the prescribed load information message.

18. The base station apparatus according to claim 11, wherein the processor is further configured to execute the instructions to set load information of a network operator supported in the neighbor cell individually, or set load information of all of the network operators supported in the neighbor cell collectively, in the prescribed load information message, depending on which of an individual reporting request and a batch reporting request the prescribed load information request massage indicates.

19. The base station apparatus according to claim 18, wherein the another base station apparatus creates the prescribed load information request message by:
dividing eNB1 Measurement IDs into a predetermined number of groups in accordance with a predetermined division rule shared with the base station apparatus; and
allocating at least one part of the groups to the individual reporting request and at least the other part of the groups to the batch reporting request.

20. The base station apparatus according to claim 11, wherein the prescribed load information request message and the prescribed load information message are a message based on Resource Status Reporting Initiation Procedure and a message based on Resource Status Reporting Procedure in an LTE (Long Term Evolution) system, respectively.

21. The base station apparatus according to claim 11, wherein the prescribed load information request message and the prescribed load information message are a message based on Multi-Cell Load Reporting Request in RAN (Radio Access Network) Information Request/Multiple Report Procedure and a message based on Multi-Cell Load Reporting Response in RAN Information Send Procedure in Inter RAT (Radio Access Technology), respectively.

* * * * *